(12) United States Patent
López De Echazarreta Elvira et al.

(10) Patent No.: US 9,752,240 B2
(45) Date of Patent: Sep. 5, 2017

(54) ELECTROCHEMICAL CELL AND REACTOR FORMED BY THE CELL

(75) Inventors: Sergio López De Echazarreta Elvira, Sarriguren (ES); Maria Santa María Iruzubieta, Sarriguren (ES); Raquel Rojo Ochoa, Sarriguren (ES); Isabel Carrilero Borbujo, Sarriguren (ES)

(73) Assignees: INGETEAM POWER TECHNOLOGY, S.A., Bizkaia (ES); ACCIONA ENERGÍA, S.A., Sarriguren (ES)

( * ) Notice: Subject to any disclaimer, the term of this patent is extended or adjusted under 35 U.S.C. 154(b) by 406 days.

(21) Appl. No.: 14/367,399

(22) PCT Filed: Dec. 21, 2011

(86) PCT No.: PCT/ES2011/070890
§ 371 (c)(1),
(2), (4) Date: Jun. 20, 2014

(87) PCT Pub. No.: WO2013/093130
PCT Pub. Date: Jun. 27, 2013

(65) Prior Publication Data
US 2015/0299875 A1    Oct. 22, 2015

(51) Int. Cl.
*C25B 9/08* (2006.01)
*C25B 9/20* (2006.01)
(Continued)

(52) U.S. Cl.
CPC .................. *C25B 9/08* (2013.01); *C25B 9/20* (2013.01); *C25B 13/02* (2013.01); *C25B 15/08* (2013.01);
(Continued)

(58) Field of Classification Search
CPC .. C25B 1/08; C25B 9/206; C25B 9/08; C25B 9/20; C25B 13/02; C25B 15/08;
(Continued)

(56) References Cited

U.S. PATENT DOCUMENTS 4,339,324 A    7/1982   Haas
2002/0144898 A1   10/2002   LaConti et al.
(Continued)

FOREIGN PATENT DOCUMENTS

EP    1133586    10/1999
EP    1 411 569 A2    4/2004
(Continued)

OTHER PUBLICATIONS

International Search Report dated Nov. 27, 2012, issued by the International Bureau in corresponding International Application No. PCT/ES2011/070890.

*Primary Examiner* — Ciel Thomas
(74) *Attorney, Agent, or Firm* — Sughrue Mion, PLLC (57) ABSTRACT

The present invention relates to an electrochemical cell (20) comprising a bipolar plate (26); an annular support next to the bipolar plate (26); a first electrode (22) separated from the bipolar plate (26) defining a first half-cell (10') (cationic or anionic) together with the plate and the annular support. The cell also has a membrane (23) next to the first electrode (22); a second electrode (24) next to the membrane (23); and a closure element (21) defining a second half-cell (10") (cationic or anionic depending on the nature of the second electrode) together with the second electrode (24). In the present invention the closure element (21) is housed within the annular support (25).

17 Claims, 6 Drawing Sheets

(51) Int. Cl.
  *C25B 13/02*    (2006.01)
  *H01M 8/02*    (2016.01)
  *H01M 8/04*    (2016.01)
  *H01M 8/24*    (2016.01)
  *H01M 8/242*   (2016.01)
  *H01M 8/0206*  (2016.01)
  *H01M 8/0273*  (2016.01)
  *H01M 8/04089* (2016.01)
  *C25B 15/08*   (2006.01)

(52) U.S. Cl.
  CPC ....... *H01M 8/0206* (2013.01); *H01M 8/0273* (2013.01); *H01M 8/04104* (2013.01); *H01M 8/242* (2013.01)

(58) Field of Classification Search
  CPC ............. H01M 8/0206; H01M 8/0273; H01M 8/04104; H01M 8/242
  See application file for complete search history.

(56) References Cited

U.S. PATENT DOCUMENTS

| | | | |
|---|---|---|---|
| 2004/0040838 | A1 | 3/2004 | Helmke et al. |
| 2008/0083614 | A1 | 4/2008 | Swalla et al. |
| 2010/0288629 | A1* | 11/2010 | LaConti ................ C25B 9/045 204/252 |
| 2011/0198217 | A1* | 8/2011 | Nakazawa ............... C25B 1/12 204/252 |

FOREIGN PATENT DOCUMENTS

| | | | |
|---|---|---|---|
| EP | 1464730 | A1 | 10/2004 |
| GB | 2 413 002 | A | 10/2005 |
| WO | 01/89019 | A1 | 11/2001 |

* cited by examiner

ELECTROCHEMICAL CELL AND REACTOR FORMED BY THE CELL

CROSS REFERENCE TO RELATED APPLICATIONS

This application is a National Stage of International Application No. PCT/ES2011/070890 filed Dec. 21, 2011, the contents of all of which are incorporated herein by reference in their entirety.

FIELD OF THE INVENTION

The present invention relates to the field of designing and manufacturing electrochemical equipment and more specifically relates to an electrochemical cell as well as to a reactor or stack built integrating the cell, wherein the cell has a new relation between the annular support and the closure element to prevent the latter from becoming a structural part of the reactor.

BACKGROUND OF THE INVENTION

Chemical reactions which take place in the interface of an electric conductor (called an electrode, which can be a metal or a semiconductor) and an ion conductor (the electrolyte) being able to be a solution and in some special cases, a solid, are known as an electrochemical process.

An electrochemical process converts electric energy into chemical energy and vice versa. The non-spontaneous chemical reaction of separating chemical compounds by applying a direct current is known as electrolysis.

If a chemical reaction occurs by means of an externally applied potential difference, it refers to an electrochemical cell. In contrast, if the electric potential drop is created as a result of the chemical reaction, it is known as an "electric energy accumulator", also called a battery or galvanic cell.

Since the discovery of water electrolysis, the dissociation of the water molecule by means of supplying electricity for producing hydrogen and oxygen, the process has evolved and diversified into the technical industrial solutions known today.

At a very simplified level, the water electrolysis reaction is described by the following reaction:

$$2H_2O \text{ (l)} + \text{electricity} \rightarrow 2H_2 \text{ (g)} + O_2 \text{ (g)}$$

As observed, this chemical reaction is characterized in that the reaction products which are hydrogen (gas) and oxygen (gas) are generated in the stoichiometric ratio of 2:1, which implies that the production of both gases is not the same and neither is the associated fluid dynamics.

With regards to large electrolysis plants, the dominant technology is alkaline electrolysis technology, such as those described in the documents EP 1133586 B1, EP 1464730 A1 and US 200083614A1 which described the representative examples of the state of the art. All of them describe particular electrochemical reactor solutions, also known as stacks. A stack is formed by stacking electrochemical half-cells, such that two electrochemical half-cells result in an electrochemical cell the architecture of which is significant for the system efficiency.

The architecture of an electrochemical half-cell must be understood as its geometry (design) and manufacturing materials, which determines the fluid dynamic and electrochemical behavior and, hence, the efficiency of the operating equipment. The architecture also relates to the basic operation functionality, leak-tightness, mechanical strength under pressure, chemical compatibility with the products used for the reaction and with the products generated therefrom.

The state of the art of the architecture of electrochemical reactors, more specifically of the electrolysis cells, is characterized by the following:

The reactors have half-cells similar in design (geometry and material) both for the anode and the cathode, such as those described in documents EP 1 133586 B1, EP 1 464730 A1 and US 20080083614A1.

The leak-tightness is assured by means of gaskets and/or mechanized tongue and grooves on the surface of the cells. The use of gaskets requires more constructive elements; making the assembly more complex, randomized and unsafe. When the leak-tightness is achieved by means of gaskets or mechanized tongue and grooves, the voltage measurement can only be made between accessible conductive elements; i.e., the end plates of the stacks. Therefore, the voltage measurement can only be obtained for the complete electrochemical reactor as to not compromise the leak-tightness between the electrochemical cells.

As observed, one of the problems of the state-of-the-art electrochemical cells is that gaskets must be used to assure leak-tightness. Another drawback of current electrochemical cells is that due to their mechanical design, the material of the closure element must be such that it supports the pressure of the reactor formed with the cells. Furthermore, up until now, the stoichiometry of the products generated has not been taken into account, i.e., it does not have a half-cell geometry which allows handling them optimally.

BRIEF DESCRIPTION OF THE INVENTION

The present invention describes an electrochemical cell, as well as an electrochemical reactor or stack which can be formed by one or several electrochemical cells, wherein the reactor works under pressure with an ion conductive liquid flowing through it entraining the products of the electrochemical reaction which are produced upon applying electric current to the electrochemical reactor.

The electrochemical cell of the present invention comprises a bipolar plate; an annular support next to the bipolar plate; a first electrode separated from the bipolar plate defining a first half-cell (cationic or anionic) together with the plate and the annular support. The cell also has a membrane next to the first electrode; a second electrode next to the membrane; and a closure element defining a second half-cell (cationic or anionic depending on the nature of the second electrode) together with the second electrode.

As a characteristic part in the present invention, the closure element is housed within the annular support such that the closure element is not a structural element mechanically supporting the pressure of the cell.

In a preferred embodiment of the invention, the annular support includes at least one inlet conduit for delivering the ion conductive liquid to the first half-cell; at least one collection conduit for collecting the reaction products which are produced in the first half-cell; at least a first common inlet channel for delivering an ion conductive liquid to the first half-cell; at least a second common inlet channel for delivering an ion conductive liquid to the second half-cell; at least a first common collection channel for collecting the reaction products of the first half-cell; and at least a second common collection channel for collecting the reaction products of the second half-cell.

The closure element in turn includes at least one inlet conduit for delivering conductive liquid to the second half-cell, and a collection conduit for collecting the reaction products of the second half-cell.

The conduits communicate the half-cells with in the corresponding channel.

The equivalent passage sections of these conduits will be sized according to the fluid to be transported, all of them adopting one and the same section not being necessary. In a preferred embodiment, the equivalent passage section of the different conduits (both of the annular support and of the closure element) and of the different channels of the annular support can all be different from one another, all having the same dimensions or some having the same dimensions and others having dimensions different from one another.

The objective of the difference in dimensions which all these conduits and channels of the cell can have is that it is designed according to the different nature of the entering fluid (ion conductive liquid) and of the exiting fluid (reaction product, i.e., liquid and gas mixture) of the half-cells, as well as the molar amount of gas which is generated in each half-cell (oxygen in the anionic half-cell and hydrogen in the cationic half-cell).

Due to the new structural relation between the closure element and the annular support, these can be manufactured from different materials reducing the costs and adapting the selection of the material to the chemical compatibility of each half-cell.

In another embodiment of the invention, the bipolar plate comprises a conductive section; a gasket joined to each face of the conductive section, and in a more preferred embodiment, it has a conductive terminal which is accessible from the outside for measuring the operating parameters of each cell individually.

In another aspect of the invention, an electrochemical reactor or stack is provided comprising at least one electrochemical cell such as that previously defined, where one cell is placed contiguous to another.

BRIEF DESCRIPTION OF THE DRAWINGS

The invention is explained below in relation to the attached figures which illustrate an embodiment of the present invention. Nevertheless, these drawings must not be considered as limiting the invention specifically the implementation illustrated. Wherein.

DETAILED DESCRIPTION OF THE PREFERRED EMBODIMENTS OF THE INVENTION

Figure 1:
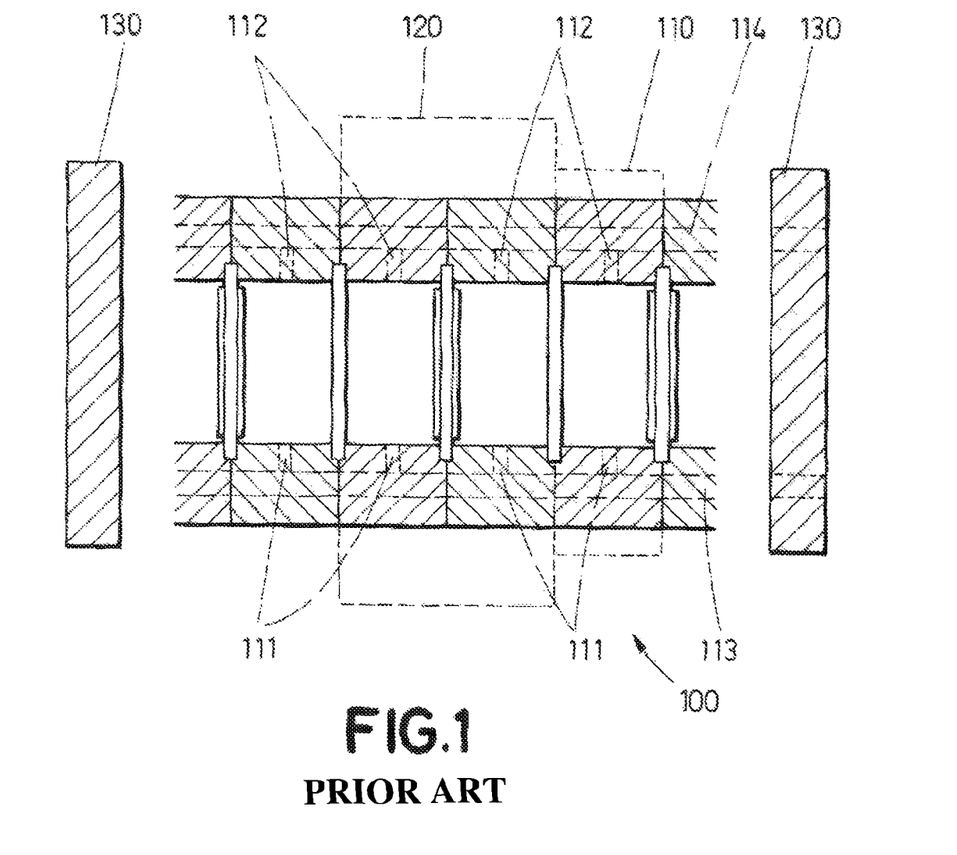
FIG. 1 is a schematic depiction of an electrochemical reactor or stack of the state of the art.

For the purpose of putting the present invention into context, reference is made to FIG. 1 of the attached drawings, wherein a cross-section view of an electrochemical reactor 100 also known as a stack of those existing in the state of the art is shown. The electrochemical reactor 100 is formed by the consecutive ordering of electrochemical half-cells 110, such that two identical electrochemical half-cells 110 result in an electrochemical cell 120 (demarcated by a broken line) the architecture of which is significant for system efficiency. In the reactor 100, the voltage measurement is made between the only accessible conductive elements, in this case, the end plates 130.

The reactor 100 has inlet conduits 111 of equal dimensions for delivering the conductive liquid. The reactor 100 has collection conduits 112 of equal dimensions where the reaction products of the half-cells 110 are collected. The reactor 100 has two common inlet channels 113 for delivering an ion conductive liquid which are the same for both the anionic half-cell and the cationic half-cell. The reactor 100 also has two common collection channels 114 for collecting the reaction products which are the same for both the anionic half-cell and the cationic half-cell.

Figure 2:
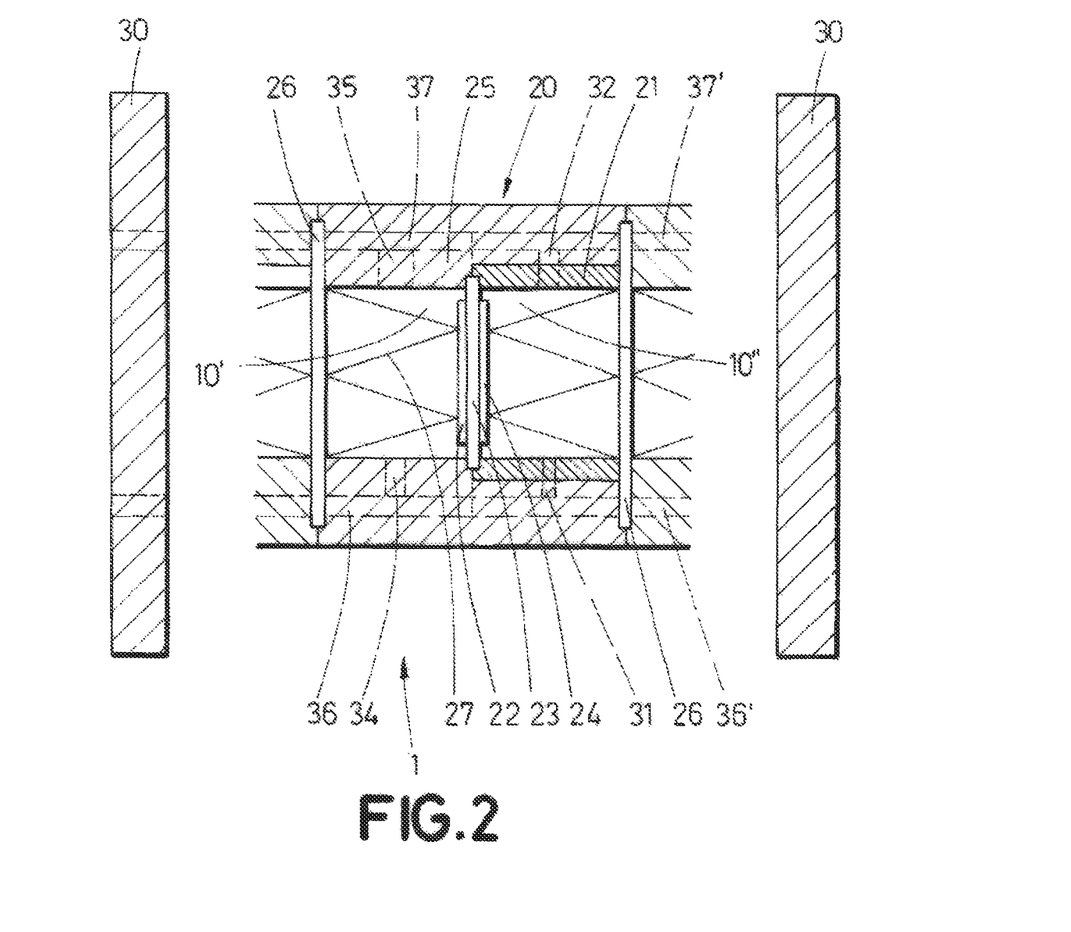
FIG. 2 is a side view of a reaction cell schematically showing the collection channels and inlet channels of the annular support, as well as the inlet and collection conduits towards the half-cells. At the same time, the inlet and outlet conduits of the closure element are also shown.
Figure 3:
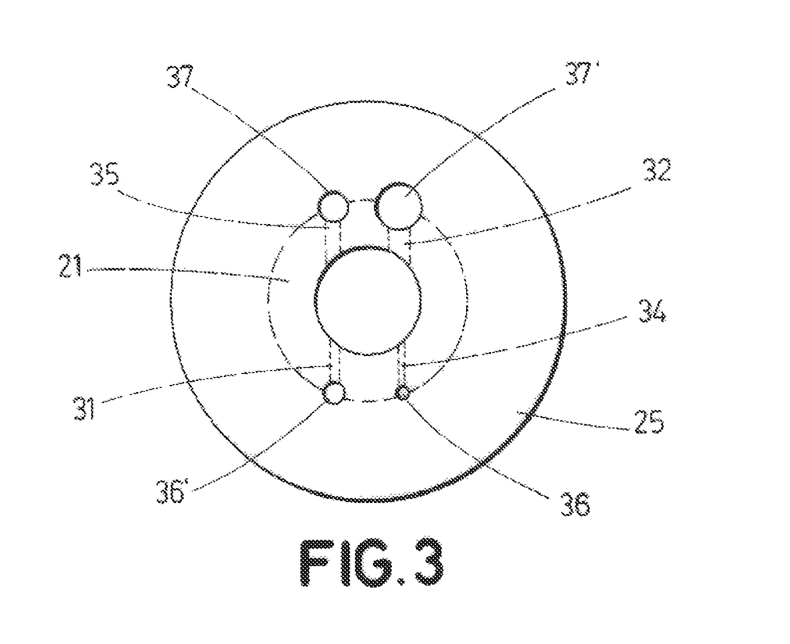
FIG. 3 is a view of a cell from the annular support according to a preferred embodiment.

Next FIGS. 2 and 3 detailing the features of a cell 20 made according to a preferred embodiment of the present invention are referred to. The successive stacking of electrochemical cells 20 between two end plates 30 demarcating it, form an electrochemical reactor 1. Therefore, defining the volume of the reactor 1 is included among the functions of the cells.

The cell 20 is made up of a bipolar plate 26; an annular support 25 next to the bipolar plate 26; a first electrode 22 (in this case the cathode) separated from the bipolar plate 26 defining a first half-cell 10' in this case a cationic half-cell (producing hydrogen) together with the plate. Another element of the cell 20 is a membrane 23 which is next to the first electrode 22. The cell also has a second electrode 24 (anode) next to the membrane 23; and a closure element 21 defining a second half-cell (10"), in this case the anodic half-cell (producing oxygen) together with the second electrode 24.

As observed, the closure element 21 and the annular support 25 do not have the same geometry (design). As has been mentioned, in the present invention the closure element 21 is housed within the annular support 25.

Thus, in the present invention, the closure element 21 is not a structural element in the cell, therefore, it is not made of a resistant element.

The annular support 25 includes inlet conduits 34 for delivering an ion conductive liquid and collection conduits 35 for collecting the reaction products, as well as first common inlet channels 36 for delivering an ion conductive liquid and second inlet channels 36' for delivering conductive liquid to feed the cationic half-cell 10' and anionic half-cell 10", respectively. The annular support also has first and second common collection channels 37 and 37' for collecting products of the cationic half-cell 10' and anionic half-cell 10". Within the reactor 1, the inlet channels 36 and 36' as well as the collection channels 37 and 37' of a cell are communicated with their respective equivalent channels of another cell.

The closure element 21 in turn also includes inlet conduits 31 and collection conduits 32 for collecting products.

The equivalent passage sections of these conduits, both of the annular support and of the closure element, and of the different channels of the annular support will be sized according to the fluid to be transported, all of them adopting one and the same section not being necessary, being able to adopt the same or different sections according to, as has been mentioned, the fluid to be transported.

In a preferred embodiment, in the annular support 25, the equivalent passage section of the collection conduit 35 for collecting products has a size between 1 to 4 times larger with respect to the equivalent passage section of the collection conduits 32 for collecting products of the closure element 21. In practical terms, for the electrolysis of an aqueous solution according to the reaction stoichiometry, the conduits 35 are larger because they collect hydrogen, whereas the conduits 32 are smaller because they collect oxygen.

This size difference occurs between the section of the inlet conduits 34 of the annular support 25 and the inlet conduits 31 of the closure element 21, where the inlet conduits 34 is between 1 to 4 times larger with respect to the conduits 31.

Likewise, it can be mentioned with respect to the inlet conduits and the outlet conduits, that the ratio between the inlet conduits 34 of the annular support 25 and the inlet conduits 31 of the closure element 21 is 1 to 4 times smaller with respect to the collection conduits 35 of the annular support 25 and the collection conduits 32 of the closure element 21 for adapting better to the different nature of the entering fluids (liquid) and exiting fluids (liquid plus gas).

As shown in FIG. 3, in the case of the collection channels 37 and 37', the ratio between their sections is also 1 to 4 times larger for those where the products of the cathodic half-cell are collected with respect to the products of the anionic half-cell. In said FIG. 3, the common inlet channels 36 and 36' for delivering the ion conductive liquid; the inlet and collection conduits 31, 32, 34 and 35; the closure element 21 and the annular support 25 are also depicted.

With respect to the inlet channels and collection channels, the ratio between the sections can also be 1 to 4 times smaller for the common inlet channels (anionic) 36' with respect to the common collection channels (anionic) 37'. On the other hand, the common collection channels (anionic) 36' and (cationic) 36 maintain a ratio of 1 to 4 times smaller. This same happens for the common collection channels (anionic) 37' and (cationic) 37. Furthermore, the ratio between the sections of the common inlet channels 36 and 36' (cationic and anionic) can also be 1 to 4 times smaller with respect to the common collection channels 37 and 37' (cationic and anionic).

Figure 4:
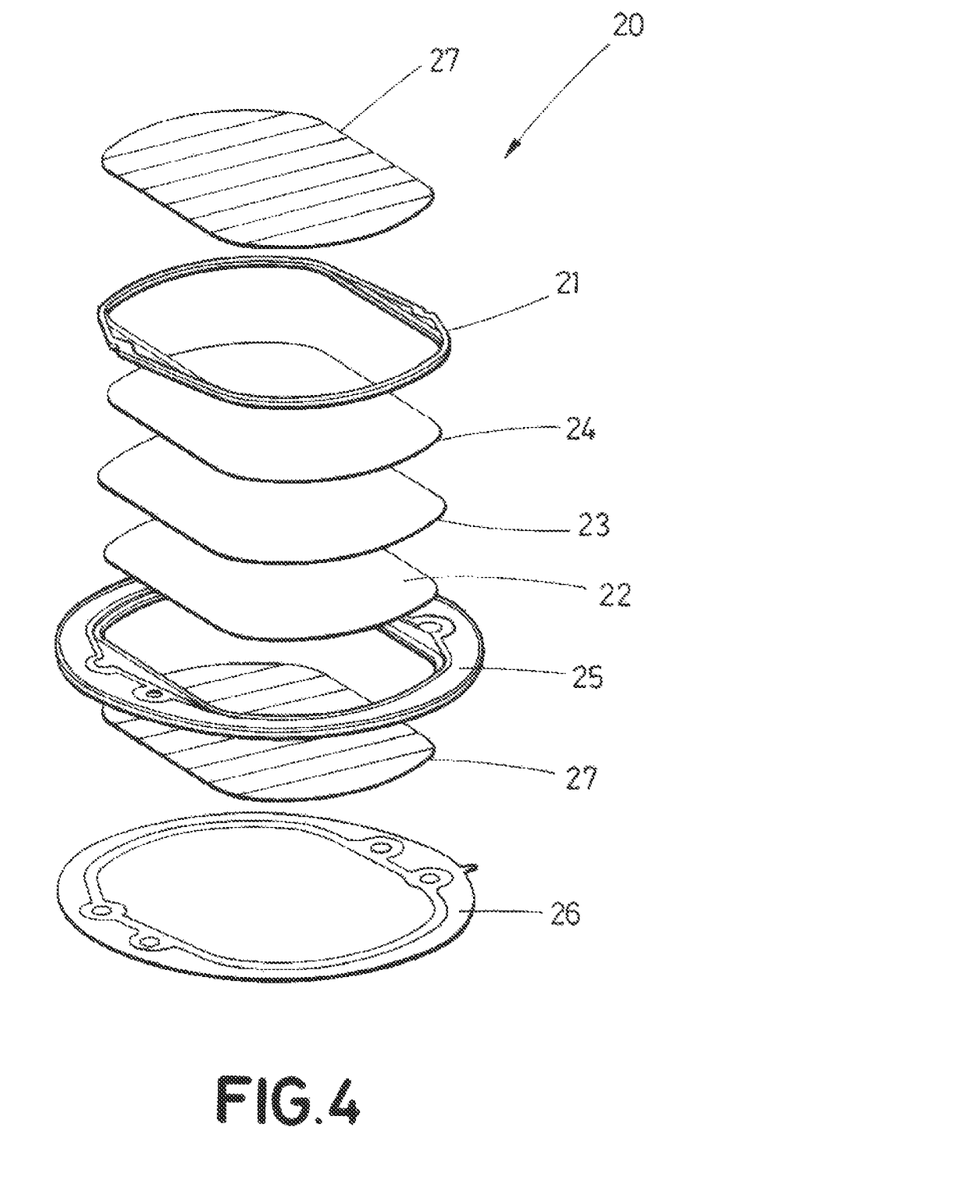
FIG. 4 is an exploded perspective view of an electrochemical cell made according to a preferred embodiment of the present invention.

In another aspect, FIG. 4 shows an exploded view of the electrochemical cell 20 made according to a preferred embodiment of the present invention, the cell 20 is preferably used for alkaline electrolysis of water and as has been explained it comprises a closure element 21, a second electrode 24 (in this case the anode) is located immediately after the latter, thus defining the anodic half-cell 10". Then, a membrane 23 is located, a first electrode 22 (in this case the cathode) is located immediately after the latter, thus defining the cationic half-cell 10'. The annular support 25 is located below the anodic half-cell 10".

In a preferred embodiment of the invention, the cell 20 has two current collectors 27. The closure element 21, the electrodes 22 and 24, the membrane 23 and the annular support 25 are located between the collectors 27. Furthermore, there is a bipolar plate 26 after the collectors 27.

In another preferred embodiment of the invention, the annular support 25 and the closure element 21 can be manufactured from different materials. The annular support 25 can be manufactured, for example, from a polymer material selected from the group comprising the following families: PPSU (polyphenylsulfone), PSU (polysulfone), PTFE (polytetrafluoroethylene), PVC (polyvinyl chloride), POM (polyoxymethylene), among others. Furthermore, the annular support 25 can be manufactured by means of some forming technique known in the state of the art such as, for example: rapid prototyping, machining or injection, among others.

The annular support 25 is preferably made of PPSU, a material with high mechanical performance which allows structurally supporting the working pressure of the electrochemical reactor 1, furthermore the PPSU has very good chemical resistance and very low water absorption. On the other hand, the closure element 21 can be manufactured from PTFE (Teflon), a material having less mechanical properties since the closure element 21 does not support mechanical stresses as it is housed in the annular support 25, furthermore, the PTFE is cheaper than the PPSU.

Figure 5:
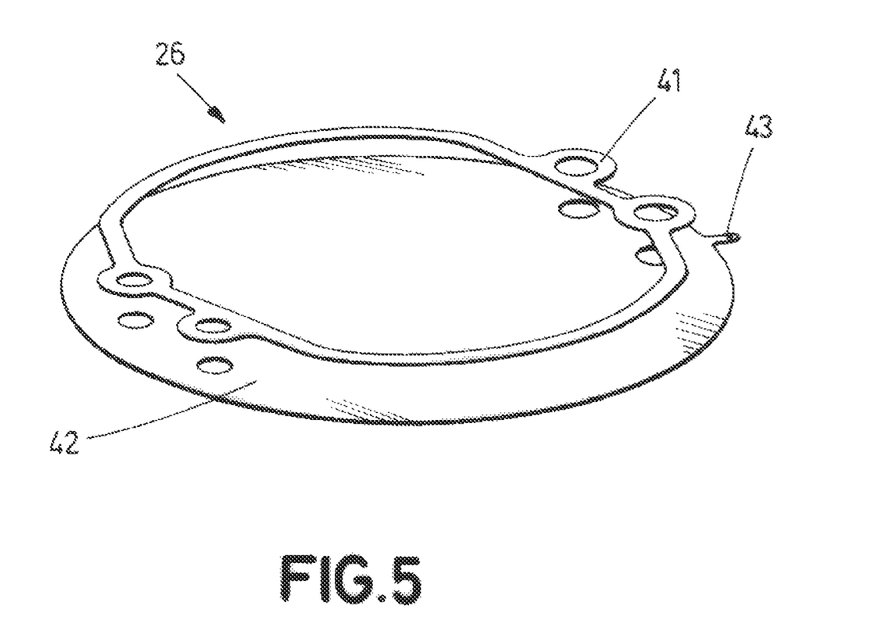
FIG. 5 is a view of the bipolar plate according to a preferred embodiment of the present invention with the element gasket in exploded view.
Figure 6:
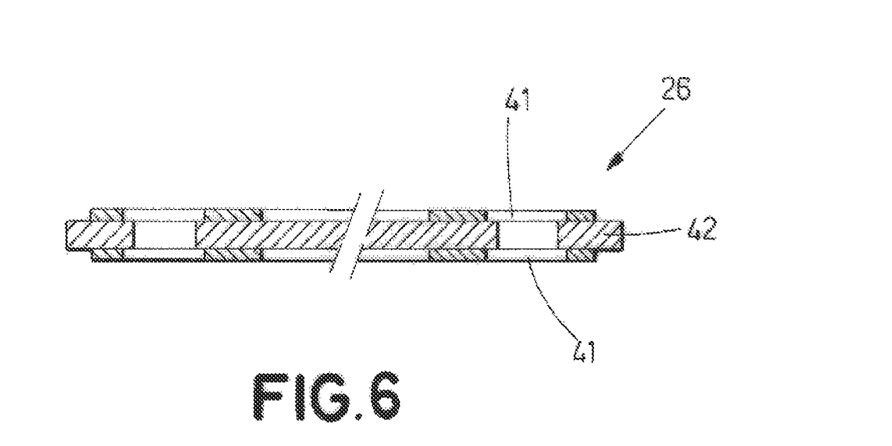
FIG. 6 is a view of the bipolar plate showing the detail of the leak-tight gasket according to a preferred embodiment of the present invention.

FIGS. 5 and 6 show other important features for the preferred embodiment related to the bipolar plate 26 which is the part that separates an electrochemical cell from another in the reactor.

The bipolar plate 26 has two objectives; the first is to maintain the leak-tightness between the cells as well as with the outside, and the second is to assure the electric continuity between the cells. To that end, in a preferred embodiment, the bipolar plate 26 comprises a conductive section 42, an integral gasket 41 on each face of the conductive section made of a material assuring the leak-tightness.

According to a preferred embodiment, the conductive section 42 of the bipolar plate 26 is flat or shaped with some particular geometry and is manufactured from different materials, from metals and alloys (for example, stainless steel or nickel) to conductive plastics.

The gasket 41 can be made of plastic material (for example, PTFE or epoxy resins), rubber (for example, EPDM—ethylene propylene diene monomer rubber). And it can be applied by different techniques of the state of the art such as, for example, impression, gluing or injection, among others.

In a preferred embodiment, the conductive section 42 of the bipolar plate 26 is a flat element made of metal material (for example, stainless steel 316 or nickel) and an epoxy resin providing the leak-tightness functionality is applied on both faces by impression.

The bipolar plate 26 has a terminal 43 extending outwards thereof and is accessible from the outside without compromising the leak-tightness of the electrochemical reactor. The fact that the terminal 43 is accessible from the outside allows measuring the operating parameters of each cell individually. Examples of said operating parameters are voltage and/or temperature measurements.

FIG. 6 depicts a cutaway view of the bipolar plate 26 wherein the conductive section 42 and an integral gasket 41 on each face of the conductive section 42 are detailed.

Figure 7:
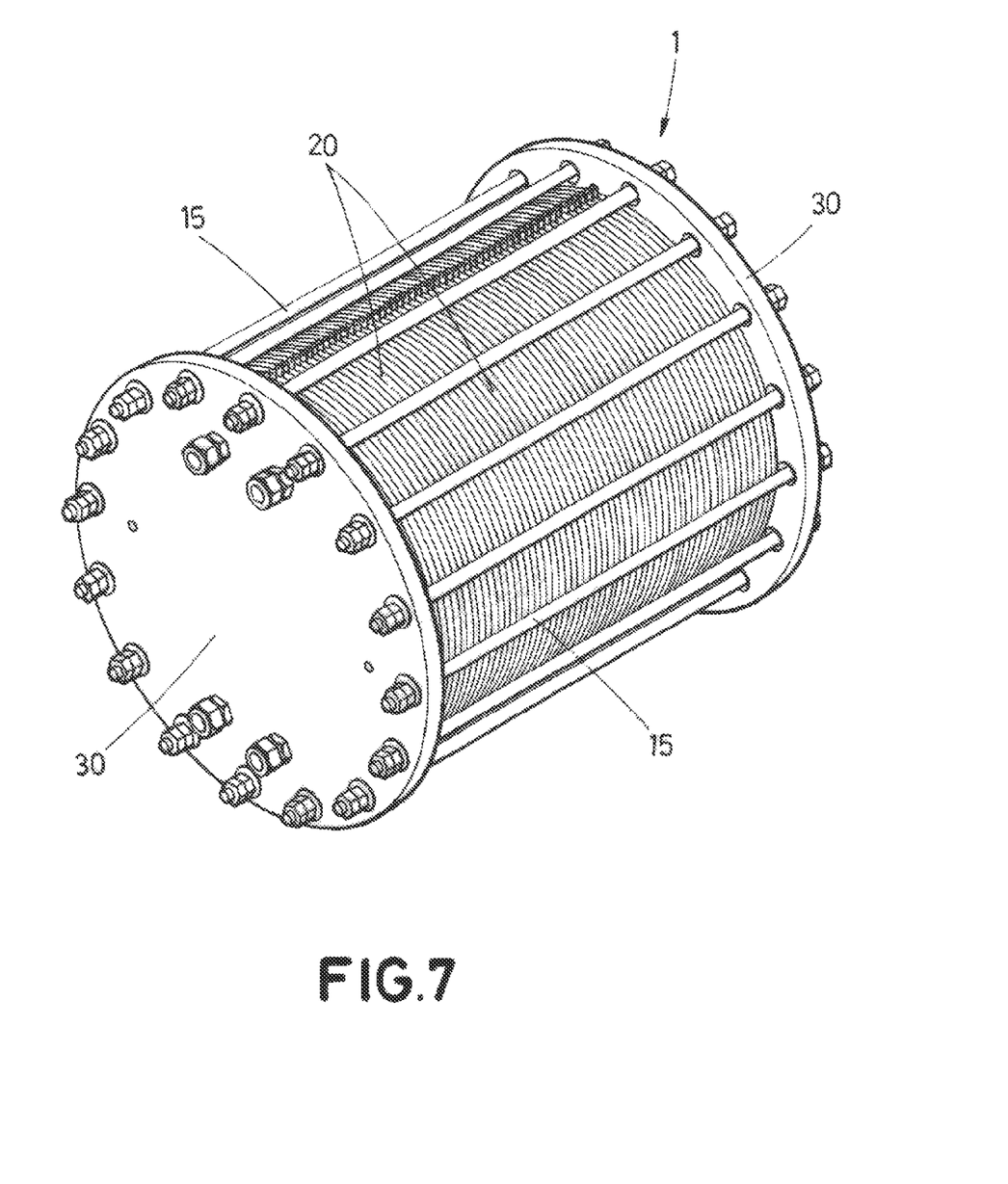
FIG. 7 is a perspective view of an electrochemical reactor or stack made of a plurality of electrochemical cells of the present invention, illustrating where the voltage measurement between cells can be made.

FIG. 7 describes how the cell of the present invention is used for making up a reactor or stack 1 comprising a plurality of cells 20. The configuration of the electrochemical reactor is that known as the "filter press" type, the electrochemical cells are ordered one after the other between end plates 30. Said end plates 30 are two metal elements between which an electric potential difference is applied, threaded rods 15, which upon being tighten according to a tightening torque established exert the closing pressure on the reactor 1, go through the end plates.

In a preferred embodiment, within the reactor 1 an alkaline electrolysis is performed using a KOH (potassium hydroxide) solution in water, for example, 33% by weight as the conductive fluid. The products resulting from the electrochemical reaction are hydrogen (gas) and oxygen (gas) generated in the stoichiometric ratio of 2:1 entrained in both cases by ion conductive liquid.

In a preferred embodiment, the electrochemical reactor 1 has sixty cells 20, with a cell voltage between 1.6-1.8 V. The voltage of the stack assembly 1 is within the range 96-108 V, the conventional control associated with the voltage measurement of the stack 1 has a variation of 12 V for the entire assembly. With the individual voltage measurement between cells 20, the control can be much more precise and not allow more than a 0.2 V deviation per cell 20 with respect to the average voltage. With this more precise control, predictive maintenance can be performed and which cell/cells 20 is/are operating out of the established ranges can be detected and they can be disassembled, repaired, replaced or bypassed.

One of the main advantages achieved with the cell 20 of the present invention is that there is a greater flexibility in the selection of materials both for the annular support 25 and the closure element 21, since the annular support 25 is the only element mechanically supporting the pressure of the electrochemical cell 20 the material of the rest of the elements not requiring great mechanical strength. On the other hand, since the reactions and the reaction products are different in each half-cell, the chemical resistance chosen is different (for example, in a preferred embodiment, the anodic half-cell of an electrolysis cell will have a chemical resistance suitable for supporting high oxygen concentrations). Greater flexibility in the design of the reaction areas and of the common channels of the electrochemical reactor 1 is also achieved.

Another advantage of the present invention is that the equivalent passage section of the inlet and collection conduits 31, 32, 34, 35 of the half-cells is optimized to the different optimal configurations of the different stoichiometries of the electrochemical reaction products, such as for example, in the case of water electrolysis for every two hydrogen molecules, one oxygen molecule is generated.

The proposed invention also allows the bipolar plate 26 to be accessible from the outside for taking the voltage measurement through the section of each electrochemical cell 20 individually without compromising the leak-tightness thereof. This advantage allows simply monitoring by means of sensors at least one of the cells 20 of an electrochemical reactor 1. The voltage measurement enables an active control, being able to be used to continuously determine and monitor the correct operation of the electrochemical cell/cells 20 monitored by means of sensors, and in the event of malfunction, determining which electrochemical cell/cells 20 is/are malfunctioning. Therefore, the control and maintenance are improved with respect to the traditional solution in which it cannot be determined which cell 20 has malfunctioned and a preventive maintenance strategy cannot be implemented (since it does not have the detailed measurements of the electrochemical cells 20 but an overall measurement of the electrochemical reactor 1). In the traditional solution, it is necessary to stop operation and disassemble the stack to determine the reasons for the malfunction.

Furthermore, the cell 20 facilitates and simplifies the stack assembly operations by reducing the number of necessary parts with respect to a conventional system. Furthermore, since the leak-tightness of the reactor 1 is achieved through a single element, which is the bipolar plate 26, a suitable assembly is assured by design, eliminating the randomness in placing the gaskets and reducing the probability of malfunction due to human error.

The differences in geometry between both parts (annular support 25 and closure element 21), offer flexibility for using, in addition to different materials, different properties of the individual conduits of the half-cells (section, number of conduits, length, among others). This is fundamental since the electrochemical electrolysis reactions are not stoichiometrically the same (two hydrogen molecules for every oxygen molecule produced). Providing the system flexibility to enable sizing the inlet conduits (31 and 34) and collection conduits (32, and 35) of the half-cells of the annular support 25 and closing support 21 in a manner suitable for the production, allows optimizing the fluid dynamics.

Although the preferred embodiments of the present invention have been described and exemplified, it must be emphasized that numerous modifications of the embodiments are possible. Therefore, the present invention must not be considered as limited except by the prior art and the scope of the attached claims.

LIST OF REFERENCES

1 Electrochemical reactor
10' 10" Half-cells
15 Threaded rods
20 Electrochemical cell
21 Closure element
22 Electrode (cathode)
23 Membrane
24 Electrode (anode)
25 Annular support
26 Bipolar plate
27 Current collectors
30 End plates
31 Inlet conduits of the closure element.
32 Collection conduits of the closure element
34 Inlet conduits of the annular support.
35 Collection conduits of the annular support.
36, 36' First and second ion conductive liquid feed channels for the half-cells.
37, 37' First and second collection channels for collecting reaction products of the half-cells
41 Gasket
42 Conductive section
43 Terminal

The invention claimed is:
1. Electrochemical cell comprising:
 a bipolar plate;
 an annular support next to the bipolar plate,
 a first electrode separated from the bipolar plate defining a first half-cell together with the bipolar plate and the annular support;
 a membrane next to the first electrode;
 a second electrode next to the membrane; and
 a closure element together with the second electrode defining a second half-cell
 wherein the closure element is housed within the annular support,
 the closure element which is not a structural element mechanically supporting the pressure of the cell including:
  at least one inlet conduit for delivering an ion conductive liquid to one of the half-cells; and, at least one collection conduit for collecting the reaction products which are produced in one of the half-cells.

2. Electrochemical cell according to claim 1, characterized in that the annular support includes:
   the at least one inlet conduit for delivering an ion conductive liquid to one of the half-cells;
   the at least one collection conduit for collecting the reaction products which are produced in one of the half-cells,
   at least a first common inlet channel for delivering an ion conductive liquid to the first half-cell;
   at least a second common inlet channel for delivering an ion conductive liquid to the second half-cell
   at least a first common collection channel for collecting the reaction products of the first half-cell
   at least a second common collection channel for collecting the reaction products of the second half-cell.

3. Electrochemical cell according to claim 2, characterized n that equivalent passage sections of the at least one inlet conduit, of the at least on collection conduit, of the first common inlet channel and the second common inlet channel as well as of the first common collection channel and the second common collection channel with be equal to or different from one another, depending on the fluid which goes through it.

4. Electrochemical cell according to claim 3, characterized in that the at least one inlet conduit of the annular support and the closure element has an equivalent passage section which is different with respect to the at least one collection conduit of the annular support and the closure element.

5. Electrochemical cell according to claim 3, characterized in that the at least one inlet conduit of the annular support and the closure element has a passage section which is different from one another.

6. Electrochemical cell according to claim 3, characterized in that at least one collection conduit of the annular support and the closure element has an equivalent passage section which is different from one another.

7. Electrochemical cell according to claim 3, characterized in that the at least first common inlet channel and the at least second common inlet channel have a passage section which is different from one another.

8. Electrochemical cell according to claim 3, characterized in that the at least first common collection channel and the at least second common channel collection have an equivalent passage section which is different from one another.

9. Electrochemical cell according to claim 2, characterized in that a passage section of the at least one inlet conduit of the annular support and the closure element have a passage section which is between 1 and 4 times smaller with respect to the at least one collection conduit of the annular support and the closure element.

10. Electrochemical cell according to claim 1, characterized in that the annular support and the closure element are made of materials which are different from one another.

11. Electrochemical cell according to claim 1, characterized in that the annular support and the closure element are made of the same material.

12. Electrochemical cell according to claim 1, characterized in that the bipolar plate comprises a conductive section with two main faces; and a gasket joined to each face of the conductive section.

13. Electrochemical cell according to claim 12, characterized in that the bipolar plate additionally comprises a flap extending outwards from the conductive section thereof that is accessible from the outside.

14. Electrochemical cell according to claim 12, characterized in that the conductive section of the bipolar plate is flat or shaped with a particular geometry.

15. Electrochemical cell according to claim 12, characterized in that the gasket is manufactured from rubbers or plastic materials.

16. Electrochemical reactor comprising:
   two common inlet channels configured to deliver an ion conductive liquid to at least one electrochemical cell as defined in claim 1; and
   two common collection channels for collecting reaction products from the at least one electromechanical cell.

17. Electrochemical reactor according to claim 16, further characterized in that it includes a current collector.

* * * * *